US009023231B2

(12) United States Patent
Poole et al.

(10) Patent No.: US 9,023,231 B2
(45) Date of Patent: May 5, 2015

(54) NON OZONE DEPLETING AND LOW GLOBAL WARMING POTENTIAL REFRIGERANTS FOR LOW TEMPERATURE REFRIGERATION

(75) Inventors: John Edward Poole, Altrincham (GB); Richard Powell, Bunbury (GB)

(73) Assignee: RPL Holdings Limited, Hale, Altrincham (GB)

( * ) Notice: Subject to any disclaimer, the term of this patent is extended or adjusted under 35 U.S.C. 154(b) by 533 days.

(21) Appl. No.: 13/515,798

(22) PCT Filed: Dec. 21, 2010

(86) PCT No.: PCT/GB2010/002314
§ 371 (c)(1),
(2), (4) Date: Aug. 27, 2012

(87) PCT Pub. No.: WO2011/077088
PCT Pub. Date: Jun. 30, 2011

(65) Prior Publication Data
US 2012/0312048 A1 Dec. 13, 2012

(30) Foreign Application Priority Data
Dec. 21, 2009 (GB) .................................. 0922288.6

(51) Int. Cl.
*C09K 5/04* (2006.01)
*F25B 9/00* (2006.01)

(52) U.S. Cl.
CPC ............. *C09K 5/045* (2013.01); *C09K 2205/12* (2013.01); *C09K 2205/22* (2013.01); *F25B 9/006* (2013.01)

(58) Field of Classification Search
CPC ............ C09K 5/045; C09K 5/04; F28D 5/00; F25B 23/00; F25B 9/00
USPC .................. 252/67, 68, 304, 498; 62/467, 468
See application file for complete search history.

(56) References Cited

U.S. PATENT DOCUMENTS

| | | | |
|---|---|---|---|
| 4,138,855 A | 2/1979 | Jahan et al. | |
| 4,198,313 A | 4/1980 | Bargigia et al. | |
| 4,272,960 A | 6/1981 | Wahl, III | |
| 4,482,465 A | 11/1984 | Gray | |
| 4,810,403 A | 3/1989 | Bivens et al. | |
| 4,941,986 A | 7/1990 | Jolly | |
| 4,944,890 A | 7/1990 | Deeb et al. | |
| 5,026,497 A | 6/1991 | Merchant | |
| 5,080,823 A | 1/1992 | Arnaud et al. | |
| 5,108,637 A | 4/1992 | Pearson | |
| 5,182,040 A | 1/1993 | Bartlett et al. | |
| 5,304,320 A | 4/1994 | Barthelemy et al. | |
| 5,360,566 A | 11/1994 | Stevenson | |
| 5,370,812 A | 12/1994 | Brown | |
| 5,417,871 A | 5/1995 | Minor et al. | |
| 5,425,890 A | 6/1995 | Yudin et al. | |
| 5,458,798 A | 10/1995 | Lunger et al. | |
| 5,622,644 A | 4/1997 | Stevenson et al. | |
| 5,624,596 A | 4/1997 | Lunger et al. | |
| 5,626,790 A | 5/1997 | Minor | |
| 5,672,293 A | 9/1997 | Minor et al. | |
| 5,685,163 A | 11/1997 | Fujita et al. | |
| 5,722,256 A | 3/1998 | Shiflett | |
| 5,785,883 A | 7/1998 | Minor et al. | |
| 5,954,995 A | 9/1999 | Goble | |
| 6,106,740 A | 8/2000 | Powell et al. | |
| 6,117,356 A | 9/2000 | Powell et al. | |
| 6,508,950 B1 * | 1/2003 | Lim et al. ........................ | 252/67 |
| 6,526,764 B1 | 3/2003 | Singh et al. | |
| 6,604,368 B1 | 8/2003 | Powell et al. | |
| 6,606,868 B1 | 8/2003 | Powell et al. | |
| 6,629,419 B1 | 10/2003 | Powell et al. | |
| 6,783,691 B1 | 8/2004 | Bivens et al. | |
| 6,991,743 B2 | 1/2006 | Poole et al. | |
| 7,972,528 B2 | 7/2011 | Poole et al. | |
| 8,465,664 B2 | 6/2013 | Poole et al. | |
| 2003/0001132 A1 | 1/2003 | Lee et al. | |
| 2003/0197149 A1 * | 10/2003 | Lee et al. ........................ | 252/67 |
| 2004/0016902 A1 | 1/2004 | Lee et al. | |
| 2007/0290163 A1 | 12/2007 | Poole et al. | |
| 2009/0224199 A1 | 9/2009 | Poole et al. | |
| 2009/0242828 A1 | 10/2009 | Poole et al. | |
| 2011/0226983 A1 | 9/2011 | Poole et al. | |
| 2014/0158930 A1 * | 6/2014 | Poole et al. ..................... | 252/67 |

FOREIGN PATENT DOCUMENTS

| | | |
|---|---|---|
| DE | 4116274 | 11/1992 |
| EP | 608164 | 7/1994 |
| EP | 430169 | 8/1994 |
| EP | 565265 | 12/1995 |
| EP | 539952 | 1/1996 |
| EP | 720639 | 6/1997 |
| EP | 779352 | 6/1997 |

(Continued)

OTHER PUBLICATIONS

U.S. Appl. No. 12/281,304, Office Action mailed Oct. 14, 2010.
U.S. Appl. No. 12/281,306, Office Action mailed Mar. 24, 2010.
U.S. Appl. No. 12/281,306, Office Action mailed Oct. 18, 2010.
U.S. Appl. No. 12/281,306, Notice of Allowance mailed Apr. 1, 2011.
U.S. Appl. No. 13/118,304, "Refrigerant Composition", Poole et al., filed May 27, 2011.
U.S. Appl. No. 12/281,304, Office Action mailed Jul. 6, 2011.
U.S. Appl. No. 12/281,304, Office Action mailed Mar. 25, 2011.
U.S. Appl. No. 12/281,304, Office Action mailed Nov. 16, 2011.
U.S. Appl. No. 13/118,304, Office Action mailed Nov. 29, 2011.
U.S. Appl. No. 12/281,304, Office Action mailed May 1, 2012.
U.S. Appl. No. 13/118,304, Office Action mailed Jun. 6, 2012.

(Continued)

*Primary Examiner* — Douglas McGinty
(74) *Attorney, Agent, or Firm* — Weaver Austin Villeneuve & Sampson LLP

(57) ABSTRACT

Non ozone depleting and non flammable refrigerant compositions with GWPs less than 2,000 ITH which replace R404A, R507, HCFC22 and CFC502 in refrigeration systems.

23 Claims, No Drawings

(56) References Cited

FOREIGN PATENT DOCUMENTS

| | | | | |
|---|---|---|---|---|
| EP | 659862 | 6/1998 | | |
| EP | 1193305 | 4/2002 | | |
| EP | 1193305 A1 * | 4/2002 | ............... | C09K 5/04 |
| EP | 509673 | 11/2003 | | |
| GB | 2510322 A * | 8/2014 | | |
| JP | 04-018484 | 1/1992 | | |
| JP | 07-173462 | 7/1995 | | |
| JP | 08-143696 | 6/1996 | | |
| JP | 08-170074 | 7/1996 | | |
| JP | 09-208940 | 8/1997 | | |
| JP | 11-181414 | 7/1999 | | |
| WO | 92/01762 | 2/1992 | | |
| WO | 92/11339 | 7/1992 | | |
| WO | 92/16597 | 10/1992 | | |
| WO | 94/26835 | 5/1994 | | |
| WO | 95/08602 | 3/1995 | | |
| WO | 96/03472 | 2/1996 | | |
| WO | 96/03473 | 2/1996 | | |
| WO | WO 9603473 A1 * | 2/1996 | ............... | C09K 5/04 |
| WO | 97/07179 | 2/1997 | | |
| WO | 97/15637 | 5/1997 | | |
| WO | 98/08912 | 3/1998 | | |
| WO | 99/36485 | 7/1999 | | |
| WO | 2005/083028 | 9/2005 | | |
| WO | 2008/113984 | 9/2008 | | |

OTHER PUBLICATIONS

U.S. Appl. No. 13/118,304, Office Action mailed Oct. 15, 2012.
U.S. Appl. No. 12/281,304, Office Action mailed Apr. 5, 2013.
U.S. Appl. No. 13/118,304, Notice of Allowance mailed May 6, 2013.
U.S. Appl. No. 12/281,304, Notice of Allowance mailed Aug. 21, 2013.
U.S. Appl. No. 13/893,179, Office Action mailed Oct. 30, 2014.
CN patent application No. 201080064491.6, Office Action mailed Apr. 30, 2014.
EP patent application No. 10807634.0, Exam Report mailed Apr. 15, 2013.
U.S. Appl. No. 13/893,179, Office Action mailed Dec. 12, 2014.

* cited by examiner

NON OZONE DEPLETING AND LOW GLOBAL WARMING POTENTIAL REFRIGERANTS FOR LOW TEMPERATURE REFRIGERATION

This invention relates to refrigerant compositions particularly but not exclusively to compositions which have a Global Warming Potential (GWP) of less than 2,000 on an Integrated Time Horizon (ITH) of 100 years, and which have a minimal adverse effect on stratospheric ozone. This invention relates to compositions which are particularly but not exclusively for the replacement of R404A and R507 in refrigeration systems and which are non flammable, energy efficient and of low toxicity.

It is well known that chlorofluorocarbons (CFCs) such as CFC12 and CFC502 and hydrochlorofluorocarbons such as HCFC22 migrate to the stratosphere where they are broken down by ultra-violet light to attack the ozone layer. These Ozone Depleting Substances (ODS) are in the process of being replaced by non ozone depleting alternatives such as hydrofluorocarbons (HFCs) which are non flammable, efficient and of low toxicity. In certain applications, particularly but not specifically related to low temperature refrigeration systems often found in supermarkets, R502 was the main refrigerant of choice due largely to its lower discharge temperature compared to R22. As a consequence of the global environmental agreement embodied in the Montreal Protocol, R502 has been banned in many countries and will be phased out in the remaining countries which are signatories to this agreement by the end of 2010.

The main non ozone depleting replacements for R502 are HFC compositions with refrigerant numbers R404A and R507 which, while being excellent refrigerants in terms of energy efficiency, non flammability, low toxicity and thermodynamic properties, nevertheless have GWPs which are at the high end of the range of commonly used HFCs. R134a has a GWP of 1,300, but R404A and R507 have GWPs of 3,982 and 3,985 respectively according to the Fourth Assessment Report of the Intergovernmental Panel on Climate Change.

U.S. Pat. No. 5,722,256 discloses constant boiling mixtures for use as refrigerants and for other purposes, comprising R125, R32 and R134a. Propane or R227ea may be substituted or combined with these mixtures.

Preferred embodiments of the present invention provide refrigerant compositions which are non flammable under all conditions of fractionation as defined under ASHRAE (American Society for Heating Refrigeration and Air conditioning Engineers) Standard 34. While replacing R404A and R507 with a substantial reduction in GWP, preferred embodiments of this invention also enable the replacement of Ozone Depleting Substances in existing units without the need to change the lubricant or make any significant changes to the system hardware. Where the ingress of moisture or other problems have been experienced with oxygen containing oils, the new compositions allow such oils to be replaced by hydrocarbon oils.

A preferred aspect of the present invention also relates to refrigeration, air conditioning and heat pumping devices that use these refrigerant compositions and operate on the reverse Rankine Cycle.

A further preferred aspect of the present invention further relates to refrigeration, air conditioning and heat pumping devices that use these refrigerant compositions and operate on a Lorentz Cycle.

According to a first aspect of the present invention, there is provided a refrigerant composition consisting essentially of a hydrofluorocarbon component consisting of

| | |
|---|---|
| HFC 134a | 15-45% |
| HFC 125 | 20-40% |
| HFC 32 | 25-45% |
| HFC 227ea | 2-12% |
| HFC 152a | 2-10% | together with an optional hydrocarbon component; wherein the amounts are by weight and selected to total 100%.

In a preferred embodiment of the invention the hydrofluorocarbon component consists of:

| | |
|---|---|
| HFC 134a | 25-40% |
| HFC 125 | 25-35% |
| HFC 32 | 35-40% |
| HFC 227ea | 2-12% |
| HFC 152a | 2-10% |

A preferred hydrocarbon component consists essentially of:

| | |
|---|---|
| R134a | 15-40% |
| R125 | 25-40% |
| R32 | 25-40% |
| R227ea | 2-10% |
| R152a | 2-10% |

A further hydrocarbon component consists essentially of:

| | |
|---|---|
| R134a | 15-32% |
| R125 | 25-39% |
| R32 | 25-40% |
| R227ea | 2-10% |
| R152a | 2-10% |

A further hydrocarbon component consists essentially of:

| | |
|---|---|
| R134a | 20-32% |
| R125 | 29-37% |
| R32 | 27-37% |
| R227ea | 2-7% |
| R152a | 2-7% |

A further hydrocarbon component consists essentially of:

| | |
|---|---|
| R134a | 28% |
| R125 | 31% |
| R32 | 31% |
| R227ea | 5% |
| R152a | 5% |

A further hydrocarbon component consists essentially of:

| | |
|---|---|
| R134a | 26% |
| R125 | 32% |
| R32 | 32% |
| R227ea | 5% |
| R152a | 5% |

A further hydrocarbon component consists essentially of:

| | |
|---|---|
| R134a | 24% |
| R125 | 33% |

-continued

| | |
|---|---|
| R32 | 33% |
| R227ea | 5% |
| R152a | 5% |

A further hydrocarbon component consists essentially of:

| | |
|---|---|
| R134a | 30% |
| R125 | 30% |
| R32 | 30% |
| R227ea | 5% |
| R152a | 5% |

A further hydrocarbon component consists essentially of:

| | |
|---|---|
| R134a | 22% |
| R125 | 34% |
| R32 | 34% |
| R227ea | 5% |
| R152a | 5% |

A further hydrocarbon component consists essentially of:

| | |
|---|---|
| R134a | 35% |
| R125 | 35% |
| R32 | 35% |
| R227ea | 5% |
| R152a | 5% |

In particularly preferred compositions no further hydrofluorocarbons are present besides those disclosed in this specification.

The compositions of this invention consist essentially of these compounds, in the sense that minor amounts of impurities or additives may be present provided that the essential properties of the compositions are not adversely affected.

Preferred embodiments of this invention relate to refrigerant blends of HFCs and optionally hydrocarbons with GWPs of 2,000 or less, but which have similar performances in refrigeration units to R404A and R507 while also being non flammable and of low toxicity.

The ranges of HFC components of preferred embodiments have been selected so that all compositions within these ranges have GWPs below 2,000. While specific compositions of R134a, R125 and R32 can result in blends with GWPs below 2,000 and similar performances as R404A and R507, the addition of R152a is advantageous in that it further reduces the overall GWP of the blend. The inclusion of R227ea ensures that blends do not become flammable under operating conditions, and enhances oil return to the compressor due to emulsification of the lubricant.

While the use of alternatives to HFCs such as hydrocarbons and carbon dioxide ($CO_2$), both of which have considerably lower GWPs than HFCs, are technically feasible in refrigeration systems, these alternatives have inherent disadvantages which mitigate against their general usage particularly in public areas such as supermarkets. In the case of hydrocarbons, their high flammability means that they can only be used safely in conjunction with a secondary refrigeration circuit which makes for energy inefficiency and higher costs. In a typical supermarket refrigeration system, $CO_2$ has to be used in the transcritical cycle on the high side of the system. This use also results in an energy penalty together with very high operating pressures. These factors present an additional safety hazard. This invention relates to refrigerants having direct GWPs which are lower than those of R404A and R507 by close to 50%

HFCs do not have adequate solubility in traditional lubricants such as mineral and alkylbenzene oils so that synthetic oxygen containing lubricants, which are expensive and hygroscopic, have been introduced specifically for new equipment.

Refrigerant blends such as R404A, R507, R410A, R407C and others have been commercialised as replacements for CFCs and HCFCs but, because these compositions contain only HFC components, they cannot be used with the traditional hydrocarbon lubricants commonly found in use with CFCs and HCFCs. If these blends are to be used to replace CFCs and HCFCs in existing equipment, the major chemical manufacturers have recommended that no more than 5% of the traditional lubricant in the system be retained. Therefore a virtually complete change of lubricant to a synthetic oxygen containing lubricant resulting in a full retrofit is required. This requires a full retrofit. This is often costly and technically unsatisfactory. In particular to ensure adequate oil return, hydrocarbon lubricants, such as mineral oil, have been replaced by oxygen containing lubricants, notably polyol esters and polyalkylene glycols. Unfortunately these materials are liable to absorb atmospheric moisture, especially during maintenance. This absorption can contribute to excessive corrosion and wear in equipment. Reliability of the equipment may be reduced. Preferred embodiments of this patent provide HFC/hydrocarbon blends that enable the continued use of hydrocarbon oils in both existing and new equipment.

In preferred embodiments of the compositions disclosed above the amount of HFC 227ea is in the range from about 2-12%; more preferably 3-12%; more preferably 2-10%; most preferably 4-6%; especially about 5%.

In preferred embodiments of the compositions disclosed above the amount of HFC 152a is in the range from about 3-8%; more preferably 4-6%; especially about 5%.

The presence of a hydrocarbon or mixture of hydrocarbons is not essential. However compositions containing hydrocarbons may be provided in accordance with this invention.

The hydrocarbon component of the compositions of this invention may be selected from the group consisting of: 2-methylbutane, butane, 2-methylpropane, 2,2-dimethylpropane, propane, propene, but-1-ene, but-2-ene, 2-methylpropene and mixtures thereof. Propane may be excluded from the compositions of this invention.

Preferred hydrocarbon components are selected from the group consisting of: 2-methylbutane, butane, 2-methylpropane, pentane and mixtures thereof. 2-Methylpropane is especially preferred. A mixture of 2-methylpropane and 2-methylpropene may be used. Use of 2-methylpropane as the sole hydrocarbon is especially preferred.

The amounts of the hydrocarbon components may be from a trace e.g. 0.1%-5%, preferably 0.3-5%, more preferably 0.6-4%, most preferably 2.5-3.5%.

According to a second preferred aspect of this invention there is provided a refrigeration circuit comprising:
 a first heat exchanger operatively connected to a heat sink;
 a second heat exchanger operatively connected to a first heat source; a lubricant;
 pump or compressor; and
 an expansion device connected between the heat exchangers;
 the circuit being arranged so that working fluid is circulated between the heat exchangers by the pump or compressor so that working fluid passes successively from the pump or compressor to the first heat exchanger, the expansion device, the second heat exchanger and returns to the pump or compressor;

the first heat exchanger including a first conduit for a heat transfer fluid; the second heat exchanger including a second conduit for a heat transfer fluid;

wherein the working fluid is a refrigerant composition in accordance with the first aspect of this invention.

Some of the refrigerant blends claimed in the specification are zeotropic, such that their dew points and bubble points at the same pressure differ by at least 3 K. When employed in a refrigeration unit operating on the Lorentz cycle, these blends may show an enhanced energy efficiency compared to their use in a reverse Rankine Cycle unit. The improvement is realised by exploiting the temperature differences, potentially generated by a zeotropic refrigerant, between the refrigerant inlets and outlets of the condenser and evaporator of a refrigeration unit. These temperature differences, which may simply be measured by thermocouples placed at the inlets and outlets, are often referred as "temperature glides".

According to a third aspect of the present invention there is provided a refrigeration circuit operating on a Lorentz type cycle and including:
- a first heat exchanger operatively connected to a heat sink;
- a second heat exchanger operatively connected to a first heat source;
- a lubricant;
- pump or compressor; and
- an expansion device connected between the heat exchangers;
- the circuit being arranged so that working fluid is circulated between the heat exchangers by the pump or compressor so that working fluid passes successively from the pump or compressor to the first heat exchanger, the expansion device, the second heat exchanger and returns to the pump or compressor;
- the first heat exchanger including a first conduit for a heat transfer fluid; the second heat exchanger including a second conduit for a heat transfer fluid;
- wherein at least one of the first heat exchanger and the second heat exchanger provides a temperature glide to respective flow of heat transfer fluid with the temperature at one end of the first exchanger being approximately equal to the temperature of the heat transfer fluid leaving the heat sink;
- and the temperature at one end of the second heat exchanger being approximately equal to the temperature of the heat transfer fluid leaving the heat source;
- wherein the working fluid is a refrigerant composition according to the first aspect of this invention.

The addition of a small amount of hydrocarbon to a refrigerant composition containing an HFC or a mixture of HFCs can result in sufficient hydrocarbon being dissolved in the lubricant so that the lubricant is sufficiently transported around the system so that lubrication of the compressor is maintained. It is obvious that the greater the hydrocarbon content of the composition the greater the ability of the refrigerant to transport the lubricant back to the compressor. However, too high a hydrocarbon content can lead to flammable mixtures. Although flammable refrigerants are acceptable in some applications, this invention relates to non flammable compositions for use in equipment where flammable refrigerants are prohibited. However, it is difficult to achieve non flammable compositions under all conditions including fractionation of the refrigerant compositions which can take place during a leak of the refrigerant from the system or during storage.

Some HFCs are flammable as defined under ASHRAE Standard 34. HFC32 and HFC152a, are designated as flammable by ASHRAE. This invention relates to compositions of refrigerants including both blends of non flammable HFCs with hydrocarbons and also blends of flammable HFCs, non flammable HFCs and hydrocarbons in selected proportions such that all such compositions are non flammable during fractionation while providing similar refrigerating effects and performances as the refrigerants they replace, namely R404A, R507, CFC502, HCFC22 and other ozone depleting compositions.

While this invention relates to refrigerant compositions which can be used with traditional lubricants such as mineral and alkylbenzene oils, they are also suitable for use with synthetic oxygen containing lubricants. Refrigerant compositions of this invention may be suitable replacements for R404A, R507, HCFC22 and R502 in new equipment supplied by original equipment manufacturers.

In formulating HFC blends, and in some cases HFC blends with hydrocarbons to replace R404A, R507, CFC502 and HCFC22 in specific applications, it is generally necessary to use one or more lower boiling HFCs, with one or more higher boiling HFCs. In this context preferred lower boiling HFCs are HFC32 and HFC125, and higher boiling HFCs are HFC134a, HFC152a and HFC227ea.

To avoid flammability in the blend, or in a fraction generated by a leak, for example as defined by ASHRAE Standard 34, the total amount of hydrocarbon should be minimised. The quantity of the hydrocarbon mixture dissolved in the oil also needs to be maximised for good oil return, especially at those locations in the circuit where the oil is at its most viscous, for example the evaporator. A single higher boiling hydrocarbon, such as pentane or iso-pentane, would certainly show higher solubility in the oil than a lower boiling hydrocarbon. However, in the event of a leak, for example from a cylinder, a higher boiling hydrocarbon will concentrate in the liquid phase. The amount of hydrocarbon, therefore needs to be limited in order to avoid generating a flammable mixture towards the end of the leak.

This problem could be avoided by using only a low boiling hydrocarbon such as propane or iso-butane. However, this has two disadvantages. Firstly, lower boiling hydrocarbons are less soluble than higher boiling hydrocarbons in hydrocarbon lubricants in the evaporator when present at similar weights percentages as formulated in the blend. Consequently they are less effective at ensuring good oil return. Secondly, because of their higher volatility they tend to concentrate in the vapour phase of a blend. Their concentration, therefore, needs to be restricted to avoid generating flammable mixtures at the beginning of a leak. This problem is exacerbated if one or more of the lower boiling HFCs is also flammable. Preferably the composition does not include propane.

Blends of HFC125, HFC134a and HFC32 are well known in the art as potential replacements for CFC502 and HCFC22 in new equipment in the presence of synthetic oxygen containing lubricants. The inclusion of a hydrocarbon or mixture of hydrocarbons in any such blend, in specific amounts and combinations, facilitates compatibility with traditional lubricants by ensuring oil return to the compressor. However, in these cases the presence of a hydrocarbon with HFC32 can compromise the ASHRAE flammable rating of the blend if present in too great an amount, or have a deleterious effect on oil return if present in too small an amount. The presence of HFC227ea, which is commonly used as a fire suppressing agent, enables sufficient hydrocarbon to be present in the blend to achieve a non flammable blend under all conditions of fractionation under ASHRAE Standard 34. Surprisingly it has been found that the presence of R227ea additionally enhances oil return of a hydrocarbon oil such as alkylbenzene oil to the compressor due to emulsification of the lubricant in the presence of a hydrocarbon, which in turn enables the amount of the hydrocarbon or hydrocarbon mixture to be minimised.

An important aspect of this invention is that while the inclusion of HFCs in the refrigerant compositions ensures low toxicity and a zero Ozone Depletion Potential (ODP), the addition of a hydrocarbon within defined ranges enables a non flammable designation of A1 to be achieved as defined by ASHRAE Standard 34, while at the same time ensuring oil return to the compressor despite the presence of the flammable HFC32 in the blend. This invention particularly relates to refrigerant compositions comprising hydrocarbon and hydrocarbon mixtures with HFC134a, HFC125, HFC32, HFC227ea and HFC 152a which are non flammable when fractionated under leakage tests specified under ASHRAE Standard 34 and Underwriters Laboratories UL2182.

Compositions of this invention permit the replacement of:
(1) R404A, R507 and R502 with blends of less than 2,000 GWP.
(2) R22 with blends below 2,000 GWP.
(3) R22 and R502 blends below 2,000 GWP without the need to change the existing lubricant of mineral oil or alkylbenzene in the system.

In this specification the figures stated for Global Warming Potential (GWP) refer to an Integrated Time Horizon (ITH) of 100 years as contained in the Inter Governmental Panel on Climate Change Third Assessment Report (TAR).

The present invention enables the replacement of R404A and R507, the most commonly used refrigerants in lower temperature refrigeration to be made with a substantial reduction in GWP but without any reduction in performance including energy efficiency and capacity. The invention further facilitates the replacement of Ozone Depleting Substances HCFC22 and CFC502 at low cost without the need to change either the lubricant in the system or make any alterations to the hardware while also being non ozone depleting and non flammable in accordance with ASHRAE Standard 34.

Percentages and other amounts in this specification are by weight unless indicated otherwise and are selected from any ranges given to total 100%.

The invention is further described by means of example but not in any limitative sense.

A range of blends to replace R404A, all having a Global warming Potential less than 2,000, were evaluated in a typical open compressor refrigeration unit using NIST's CYCLE D program.

| | |
|---|---|
| COOLING DUTY DELIVERED EVAPORATOR | 10 kW |
| Midpoint evaporating temperature | −35° C. |
| Superheating | 5.0° C. |
| Suction line pressure drop (in saturated temperature) | 1.5° C. |
| CONDENSER | |
| Midpoint fluid condensing temperature | 35.0° C. |
| Subcooling | 5.0° C. |
| Discharge line pressure drop (in saturated temperature) | 1.5° C. |
| LIQUID LINE/SUCTION LINE HEAT EXCHANGER | |
| Efficiency | 0.3 |
| COMPRESSOR | |
| Compressor isentropic efficiency | 0.7 |
| Compressor volumetric efficiency | 0.82 |
| Motor efficiency | 0.85 |
| PARASITIC POWER | |
| Evaporator fan | 0.3 kW |
| Condenser fan | 0.4 kW |
| Controls | 0.1 kW |

The results of analysing the performances in a refrigerator unit using these operating parameters are shown in Table 1, plus R404A for comparison.

TABLE 1

Open Compressor

Refrigerant Composition % w/w

| | R22 | R502 | R404A | 1 | 2 | 3 | 4 | 5 | 6 |
|---|---|---|---|---|---|---|---|---|---|
| R134a | | | 4 | 35 | 30 | 20 | 24 | 23 | 26 |
| R125 | | | 44 | 30 | 30 | 35 | 33 | 35 | 32 |
| R32 | | | 52 | 30 | 35 | 35 | 33 | 31 | 35 |
| 227ea | | | | 5 | 5 | 5 | 5 | 8 | 3 |
| 152a | | | | | | 5 | 5 | 3 | 4 |
| Discharge Temperature (° C.) | 119.3 | 77.6 | 71 | 101.6 | 105.1 | 105.7 | 104.8 | 101.1 | 106.9 |
| Discharge Pressure (bara) | 14.07 | 15.30 | 16.73 | 16.75 | 17.56 | 17.72 | 17.19 | 17.26 | 17.44 |
| COP (cooling) | 1.24 | 1.16 | 1.11 | 1.18 | 1.18 | 1.18 | 1.18 | 1.18 | 1.19 |
| Capacity (cooling)(kJ/m$^3$) | 707 | 706 | 697 | 726 | 775 | 785 | 755 | 751 | 772 |
| Glide Evaporator (K) | 0 | 0.1 | 0.5 | 4.4 | 4.2 | 4.4 | 4.6 | 4.5 | 4.5 |
| Glide Condenser (K) | 0 | 0 | 0.4 | 4.7 | 4.3 | 4.3 | 4.7 | 4.6 | 4.5 |
| Flow rate (kg/s) | 0.0656 | 0.1036 | 0.0961 | 0.0661 | 0.0640 | 0.0633 | 0.0635 | 0.0668 | 0.0622 |

A range of blends to replace R404A, all having a Global Warming Potential less than 2,000, were evaluated in a typical hermetic compressor refrigeration unit using NIST's CYCLE D program.

| COOLING DUTY DELIVERED EVAPORATOR | 10 kW |
|---|---|
| Midpoint evaporating temperature | −35° C. |
| Superheating | 5.0° C. |
| Suction line pressure drop (in saturated temperature) | 1.5° C. |
| CONDENSER | |
| Midpoint fluid condensing temperature | 35.0° C. |
| Subcooling | 5.0° C. |
| Discharge line pressure drop (in saturated temperature) | 1.5° C. |
| COMPRESSOR | |
| Compressor isentropic efficiency | 0.7 |
| Compressor volumetric efficiency | 0.82 |
| Motor efficiency | 0.85 |
| PARASITIC POWER | |
| Evaporator fan | 0.3 kW |
| Condenser fan | 0.4 kW |
| Controls | 0.1 kW |

The results of analysing the performances in a refrigerator unit using these operating parameters are shown in Table 2, plus R22, R502 and R404A for comparison.

TABLE 2

| Hermetic Compressor | | | | | | | | | |
|---|---|---|---|---|---|---|---|---|---|
| Refrigerant Composition % w/w | | | | | | | | | |
| | R22 | R502 | R404A | 1 | 2 | 3 | 4 | 5 | 6 |
| R134a | | | 4 | 35 | 30 | 20 | 24 | 23 | 26 |
| R125 | | 51.2 | 44 | 30 | 30 | 35 | 33 | 35 | 32 |
| R32 | | | 52 | 30 | 35 | 35 | 33 | 31 | 35 |
| 227ea | | | | 5 | 5 | 5 | 5 | 8 | 3 |
| 152a | | | | | | 5 | 5 | 3 | 4 |
| R22 | 100 | 48.8 | | | | | | | |
| Discharge Temperature (° C.) | 156.1 | 98.8 | 88.9 | 129.6 | 134.4 | 135.0 | 133.9 | 128.8 | 136.7 |
| Discharge Pressure (bara) | 14.07 | 15.30 | 16.73 | 16.75 | 17.56 | 17.72 | 17.19 | 17.26 | 17.44 |
| COP (cooling) | 1.061 | 1.035 | 0.992 | 1.089 | 1.093 | 1.087 | 1.091 | 1.008 | 1.09 |
| Capacity (cooling)(kJ/m$^3$) | 622.7 | 648.0 | 643.5 | 652.3 | 693.8 | 702.4 | 676.8 | 675.4 | 690.3 |
| Glide Evaporator (K) | 0 | 0.1 | 0.5 | 4.4 | 4.2 | 4.4 | 4.6 | 4.5 | 4.5 |
| Glide Condenser (K) | 0 | 0 | 0.4 | 4.7 | 4.3 | 4.3 | 4.7 | 4.5 | 4.5 |
| Flow rate (kg/s) | 0.0656 | 0.1036 | 0.0961 | 0.0661 | 0.0640 | 0.0633 | 0.0635 | 0.0668 | 0.0622 |

Table 3 shows the performances of Blend 4 in Table 2 operating in an hermetic compressor system at various condensing and evaporating temperatures. The following parameters are common to each condition A to D.

| COOLING DUTY DELIVERED | 10 kW |
|---|---|
| Evaporator superheating | 5.0° C. |
| Suction line pressure drop (in saturated temperature) | 1.5° C. |
| Condenser subcooling | 3.0° C. |
| Discharge line pressure drop (in saturated temperature) | 1.5° C. |
| COMPRESSOR | |
| Compressor isentropic efficiency | 0.75 |
| Compressor volumetric efficiency | 0.85 |
| Motor efficiency | 0.87 |
| PARASITIC POWER | |
| Evaporator fan | 0.3 kW |
| Condenser fan | 0.4 kW |
| Controls | 0.1 kW |

TABLE 3

Blend 4 Performance for Various Evaporator and Condenser Temperatures

| Blend 4 (wt %) | | Condition A | Condition B | Condition C | Condition D |
|---|---|---|---|---|---|
| R134a | 24 | | | | |
| R125 | 33 | | | | |
| R32 | 33 | | | | |
| 227ea | 5 | | | | |
| 152a | 5 | | | | |
| Evaporator temperature (° C.) | | −10 | −24 | −15 | −19 |
| Condenser temperature (° C.) | | 31 | 41 | 28 | 45 |
| Discharge Temperature (° C.) | | 78 | 113 | 79 | 112 |
| Discharge Pressure (bara) | | 15.50 | 19.98 | 14.32 | 22.02 |

TABLE 3-continued

Blend 4 Performance for Various Evaporator and Condenser Temperatures

| Blend 4 (wt %) | Condition A | Condition B | Condition C | Condition D |
|---|---|---|---|---|
| COP (cooling) | 2.37 | 1.34 | 2.24 | 1.38 |
| Capacity (cooling) (kJ/m³) | 2239 | 1100 | 1885 | 1305 |
| Glide Evaporator (K) | 4.8 | 4.4 | 4.9 | 4.3 |
| Glide Condenser (K) | 4.8 | 4.5 | 4.9 | 4.3 |
| Flow rate (kg/s) | 0.0575 | 0.0664 | 0.0568 | 0.0683 |

Tests were carried out in 2010 by:

Refrigerant Services Inc. 15 Williams Ave. Dartmouth, N.S., Canada using a composition of Example 4 of Tables 1 and 2 consisting of R134a 24%, R125 33%, R32 33%, R227ea 5% and R152a 5% on the following equipment:

Equipment:
- 1 HP Air-cooled Condensing Unit
- Original refrigerant R-502
- 1 Cancoil Evaporator Coil Rated 9000 Btu @1 OF TD
- Walk-in enclosure aprox. 6 ft×8 ft
- Consisting of walls ceiling and floor constructed with 2½" Styrofoam insulation
- 1 only Model Q Sporlan ½ ton TXV R-404A Procedures:

The system was charged with R-404A and the thermal expansion valve (TXV) was adjusted to approximately 8 Degrees F. There were no other pressure or temperature controlling devices on the system.

Several Tests were run in 7-8 hour sessions and the data recorded.

The R-404A was recovered from the system and the system evacuated. A similar size charge of the Example 4 composition was installed in the system.

Several tests were run in 7-8 hour sessions and the data recorded.

Data was collected and recorded as below:

EXAMPLE 4

VS R-404A PERFORMANCE TRIAL DATA

| Hour | Suct Pressure | | Disch Pressure | | Disch Temp | | Comp Amperage | | Product Temp | |
|---|---|---|---|---|---|---|---|---|---|---|
| | Ex 4 | R-404A | Ex-4 | R-404A | Ex-4 | R-404A | EX-4 | R-404A | Ex-4 | R-404A |
| 0 | | | | | | | | | | |
| 1 | 30 | 37 | 240 | 240 | 136 | 127 | 3.7 | 3.8 | 30 | 35 |
| 2 | 30 | 36 | 240 | 245 | 138 | 129 | 3.6 | 3.7 | 21 | 27 |
| 3 | 28 | 32 | 240 | 235 | 139 | 126 | 3.6 | 3.6 | 19 | 25 |
| Defrost | | | | | | | | | | |
| 4 | 30 | 29 | 240 | 232 | 138 | 126 | 3.6 | 3.5 | 25 | 27 |
| 5 | 26 | 27 | 230 | 225 | 139 | 124 | 3.5 | 3.3 | 20 | 27 |
| 6 | 24 | 23 | 235 | 210 | 138 | 122 | 3.4 | 3.2 | 22 | 27 |

| Hour | Space Temp | | Ambient Temp | | Evap Temp | | Evap In Temp | | Evap Out Temp | |
|---|---|---|---|---|---|---|---|---|---|---|
| | Ex-4 | R-404A | EX-4 | R-404A | Ex-4 | R-404A | Ex-4 | R-404A | Ex-4 | R-404A |
| 0 | | | | | | | | | | |
| 1 | 16 | 25 | 69 | 74 | 4.2 | 8 | 16 | 25 | 12.8 | 19.5 |
| 2 | 18 | 24 | 74 | 75 | −1.2 | 5.7 | 18 | 24 | 13.1 | 18.8 |
| 3 | 17 | 22 | 73 | 73 | −4.5 | 1.7 | 17 | 22 | 13.6 | 17.5 |
| Defrost | | | | | | | | | | |
| 4 | 23 | 26 | 72 | 75 | −1 | −3.7 | 23 | 26 | 13 | 20.9 |
| 5 | 18 | 26 | 70 | 74 | −4.7 | −7 | 18 | 26 | 13.4 | 21 |
| 6 | 22 | 27 | 73 | 68 | −6.8 | −10.2 | 22 | 26 | 17.8 | 23.7 |

In general terms, the Example 4 composition performed better than the R-404A. End of session space and product temperatures were consistently lower with the Example 4 composition. This indicates the capacity of the Example 4 composition may be higher than R-404A. The Example 4 composition energy consumption appeared to be similar to the R-404A energy consumption.

The TXV was adjusted one turn closed with the Example 4 composition to maintain a similar evaporator superheat as the R-404A. Suction and discharge pressures of the Example 4 composition were very similar to those of R-404A.

These results show that this product can be used to replace R-404A in existing or new systems with only minor adjustments to control settings.

The invention claimed is:

1. A refrigerant composition consisting essentially of a hydrofluorocarbon component consisting of:

|  |  |
|---|---|
| HFC 134a | 15-45% |
| HFC 125 | 20-40% |
| HFC 32 | 25-45% |
| HFC 227ea | 2-12% |
| HFC 152a | 2-10%; | and
an optional hydrocarbon component;
wherein the amounts are by weight and selected to total 100%.

2. A refrigerant composition as claimed in claim 1 wherein the hydrofluorocarbon component consists of:

|  |  |
|---|---|
| HFC134a | 15-40% |
| HFC125 | 25-40 % |
| HFC32 | 25-40% |
| HFC227ea | 2-12% |
| HFC152a | 2-10%. |

3. A refrigerant composition as claimed in claim 1 wherein the hydrofluorocarbon component consists of:

|  |  |
|---|---|
| HFC134a | 15-32% |
| HFC125 | 25-39% |
| HFC32 | 25-40% |
| HFC227ea | 2-10% |
| HFC152a | 2-10%. |

4. A refrigerant composition as claimed in claim 1 wherein the hydrofluorocarbon component consists of:

|  |  |
|---|---|
| HFC134a | 20-32% |
| HFC125 | 29-37% |
| HFC32 | 27-37% |
| HFC227ea | 2-7% |
| HFC152a | 2-7%. |

5. A refrigerant composition as claimed in claim 1 wherein the hydrofluorocarbon component consists of:

|  |  |
|---|---|
| HFC134a | 28% |
| HFC125 | 31% |
| HFC32 | 31% |
| HFC227ea | 5% |
| HFC152a | 5%. |

6. A refrigerant composition as claimed in claim 1 wherein the hydrofluorocarbon component consists of:

|  |  |
|---|---|
| HFC134a | 26% |
| HFC125 | 32% |
| HFC32 | 32% |
| HFC227ea | 5% |
| HFC152a | 5%. |

7. A refrigerant composition as claimed in claim 1 wherein the hydrofluorocarbon component consists of:

|  |  |
|---|---|
| HFC134a | 24% |
| HFC125 | 33% |
| HFC32 | 33% |
| HFC227ea | 5% |
| HFC152a | 5%. |

8. A refrigerant composition as claimed in claim 1 wherein the hydrofluorocarbon component consists of:

|  |  |
|---|---|
| HFC134a | 30% |
| HFC125 | 30% |
| HFC32 | 30% |
| HFC227ea | 5% |
| HFC152a | 5%. |

9. A refrigerant composition as claimed in claim 1 wherein the hydrofluorocarbon component consists of:

|  |  |
|---|---|
| HFC134a | 22% |
| HFC125 | 34% |
| HFC32 | 34% |
| HFC227ea | 5% |
| HFC152a | 5%. |

10. A refrigerant composition as claimed in claim 1 wherein the hydrofluorocarbon component consists of:

|  |  |
|---|---|
| HFC134a | 20% |
| HFC125 | 35% |
| HFC32 | 35% |
| HFC227ea | 5% |
| HFC152a | 5%. |

11. A refrigerant composition as claimed in claim 1 wherein the hydrocarbon component is selected from the group consisting of: 2-methylbutane, butane, 2-methyl propane, pentane 2,2-dimethyl propane, propane, propene, but-1-ene, but-2-ene, 2-methylpropene and mixtures thereof.

12. A refrigerant composition as claimed in claim 1 wherein the hydrocarbon component is selected from the group consisting of 2-methyl propane and 2-methyl propene.

13. A refrigerant composition as claimed in claim 1 wherein the hydrocarbon component is 2-methyl propane.

14. A refrigerant composition as claimed in claim 1 wherein the amount of the hydrocarbon component is from 0.1% -5%.

15. A refrigerant composition as claimed in claim 14 where the amount of hydrocarbon component is from 0.3%-5%.

16. A refrigerant composition as claimed in claim 15 where the amount of hydrocarbon component is 2.5%-3.5%.

17. A Composition as claimed in claim 1 which meets the criteria for safety classifications A1 and A2 of ASHRAE Standard 34.

18. A Composition as claimed in claim 1 which meets the criteria for safety classification A1 of ASHRAE Standard 34.

19. A refrigerant as claimed in claim 1 wherein the composition is contained in a refrigerating unit in conjunction with a compressor lubricant which is a polyolester.

20. A refrigerant as claimed in claim 1 wherein the composition is contained in a refrigerating unit in conjunction with a compressor lubricant which is a polyether.

21. A refrigerant as claimed in claim 19 in which the lubricant is a mixture of oxygen-containing lubricants.

22. A refrigeration circuit comprising:
- a first heat exchanger operatively connected to a heat sink;
- a second heat exchanger operatively connected to a first heat source;
- a lubricant;
- pump or compressor; and
- an expansion device connected between the heat exchangers;
- the circuit being arranged so that working fluid is circulated between the heat exchangers by the pump or compressor so that working fluid passes successively from the pump or compressor to the first heat exchanger, the expansion device, the second heat exchanger and returns to the pump or compressor;
- the first heat exchanger including a first conduit for a heat transfer fluid;
- the second heat exchanger including a second conduit for a heat transfer fluid;
- wherein the working fluid is a refrigerant composition as claimed in claim 1.

23. A refrigeration circuit operating on a Lorentz type cycle including:
- a first heat exchanger operatively connected to a heat sink;
- a second heat exchanger operatively connected to a first heat source;
- a lubricant;
- pump or compressor; and
- an expansion device connected between the heat exchangers;
- the circuit being arranged so that working fluid is circulated between the heat exchangers by the pump or compressor so that working fluid passes successively from the pump or compressor to the first heat exchanger, the expansion device, the second heat exchanger and returns to the pump or compressor;
- the first heat exchanger including a first conduit for a heat transfer fluid;
- the second heat exchanger including a second conduit for a heat transfer fluid;
- wherein at least one of the first heat exchanger and the second heat exchanger provides a temperature glide to respective flow of heat transfer fluid with the temperature at one end of the first exchanger being approximately equal to the temperature of the heat transfer fluid leaving the heat sink;
- and the temperature at one end of the second heat exchanger being approximately equal to the temperature of the heat transfer fluid leaving the heat source;
- wherein the working fluid is a refrigerant composition as claimed in claim 1.

* * * * *